(12) United States Patent
Katefidis

(10) Patent No.: US 8,038,755 B2  
(45) Date of Patent: Oct. 18, 2011

(54) PARTICLE SEPARATOR

(75) Inventor: Apostolos Katefidis, Gaertringen (DE)

(73) Assignee: Eisenmann Anlagenbau GmbH & Co. KG (DE)

( * ) Notice: Subject to any disclaimer, the term of this patent is extended or adjusted under 35 U.S.C. 154(b) by 888 days.

(21) Appl. No.: 11/632,447

(22) PCT Filed: Jul. 13, 2005

(86) PCT No.: PCT/EP2005/007614  
§ 371 (c)(1), (2), (4) Date: Mar. 13, 2008

(87) PCT Pub. No.: WO2006/008048  
PCT Pub. Date: Jan. 26, 2006

(65) Prior Publication Data  
US 2011/0048235 A1 Mar. 3, 2011

(30) Foreign Application Priority Data  
Jul. 15, 2004 (DE) .......... 10 2004 034 151

(51) Int. Cl.  
B01D 45/00 (2006.01)

(52) U.S. Cl. ............... 55/446; 55/441; 55/442; 55/443; 55/444; 55/445; 55/462; 55/464; 95/272

(58) Field of Classification Search ........... 55/441–446, 55/462, 464; 95/272  
See application file for complete search history.

(56) References Cited

U.S. PATENT DOCUMENTS

| | | | | |
|---|---|---|---|---|
| 4,543,108 A * | 9/1985 | Wurz | ............... | 95/272 |
| 4,640,201 A | 2/1987 | Holmes et al. | | |
| 4,802,901 A * | 2/1989 | Wurz et al. | .......... | 55/440 |
| 5,268,011 A * | 12/1993 | Wurz | ............... | 55/440 |
| 5,464,459 A * | 11/1995 | VanBuskirk et al. | .......... | 96/356 |
| 5,665,130 A * | 9/1997 | Nielsen et al. | .......... | 55/307 |
| 6,315,804 B1 * | 11/2001 | Bradley | .......... | 55/440 |
| 6,852,146 B2 * | 2/2005 | Holmes et al. | .......... | 95/216 |
| 7,686,862 B1 * | 3/2010 | Daniel et al. | .......... | 55/440 |

FOREIGN PATENT DOCUMENTS

| | | |
|---|---|---|
| DE | 4119216 A1 | 12/1992 |
| EP | 1004365 A2 | 5/2000 |
| GB | 539188 | 9/1941 |
| GB | 2183502 A | 6/1987 |
| NL | 622072 | 11/1951 |

* cited by examiner

*Primary Examiner* — Jason M Greene  
*Assistant Examiner* — Dung H Bui  
(74) *Attorney, Agent, or Firm* — Factor & Lake, Ltd.

(57) ABSTRACT

A particle separator for an air inlet unit, comprising at least one inlet channel, for a fluid flow contaminated with particles, defined between two opposing fluid guide surfaces, narrowing in the fluid flow direction and opening in an outlet channel for particles, connected to at least one fluid channel for the purified fluid which leads away from the inlet channel in a region outside the inlet channel. A method for the purification of the fluid flow contaminated with particles whereby the above is led along one of the fluid guide surfaces, which is curved, at least in a part before the outlet channel, towards the interior of the inlet channel.

15 Claims, 2 Drawing Sheets

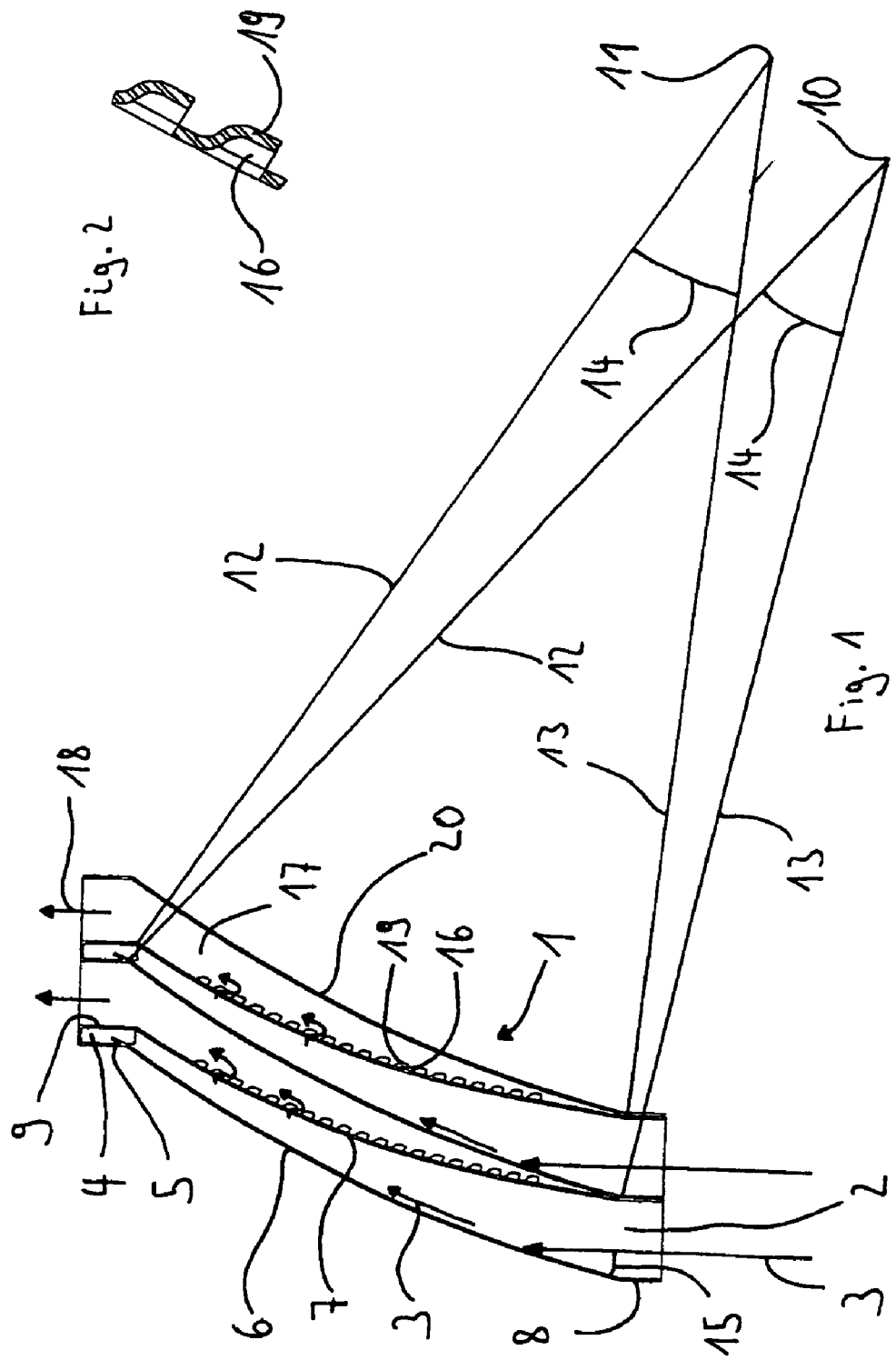

PARTICLE SEPARATOR

RELATED APPLICATIONS

This application claims the filing benefit of PCT Patent Application PCT/EP2005/007614, filed Jul. 13, 2005; and German Patent Application No. 102004034151.6, filed Jul. 15, 2004, the contents of all of which are incorporated herein by reference.

TECHNICAL FIELD

The invention relates to a particle separator, in particular for an air inlet unit, comprising at least one inlet channel for a fluid flow contaminated with particles, in particular a contaminated air flow, which is defined by two opposing fluid guide surfaces, narrows in the fluid flow direction and issues into an outlet channel for particles and which is connected to at least one fluid channel for the purified fluid which leads away from the inlet channel into a region outside the inlet channel.

Moreover, the invention relates to a method for purifying a fluid flow which is contaminated with particles, in particular a contaminated air flow where the fluid flow is directed to at least one inlet channel which narrows in the original fluid flow direction and which issues into an outlet channel for particles and where the purified fluid is directed through at least one fluid channel away from the inlet channel to a discharge channel.

BACKGROUND OF THE INVENTION

In the case of an air inlet unit, such as is used for example in the automobile industry or the smelting industry, it is necessary to remove contaminants in the form of particles from the air. The contaminants can occur in various forms depending upon the site where the units are situated. For example, in the smelting industry it is necessary to filter from the air dust grains which are greater in size than 10 µm, such as for example wind-borne sand or dusts, which differ greatly in density and size from organic dusts such as for example pollen.

The following methods for purifying incoming air are currently known:

In the case of a cyclone the contaminated air is directed into the inner chamber of a hollow, conical container through an inlet channel in the region of the base surface. The contaminated air flows along the conical periphery on a spiral track as far as the cone tip. The particles are carried by virtue of centrifugal force outwards to the inner side of the cone peripheral surface, decelerated by friction and collected in a catchment vessel at the cone tip. The air flow on the other hand is deflected at the cone tip and flows away along the cone axis from the cone tip in the direction of the base surface, in which there is provided an outlet orifice for purified air. The particles are thus separated by virtue of the centrifugal force. In order to achieve a high rate of separation it is necessary for the opening angle of the cone, the entry angle of the air-particle mixture and the rate of flow to correspond with each other in an optimum manner. This therefore necessitates an expensive arrangement. Moreover, the contaminated air flows along the spiral track a long way, on which the friction at the cone periphery causes pressure losses.

In the case of a gravity-fly separator the inlet air to be purified is directed into an inlet channel which is defined by two converging air guide plates. The inlet channel issues into an outlet channel for the particles. The air guide plates are provided with air channels for the purified air which lead substantially in the opposite direction to that of the flow of the incoming air-particle mixture out of the inlet channel. In this case the particles are separated by virtue of the fact that the particles are conveyed by gravitational force into the outlet channel, wherein the inlet channel which narrows in a funnel-like manner acts as a trap for the particles which are retained in this manner in the outlet channel. The gravity-fly separator can be produced and operated without great technical expenditure but the rate of separation in comparison to the cyclone is small.

The invention relates to a particle separator, in particular for an air inlet unit, comprising at least one inlet channel for a fluid flow contaminated with particles, in particular a contaminated air flow, which is defined by two opposing fluid guide surfaces, narrows in the fluid flow direction and issues into an outlet channel for particles and which is connected to at least one fluid channel for the purified fluid which leads away from the inlet channel into a region outside the inlet channel.

Moreover, the invention relates to a method for purifying a fluid flow which is contaminated with particles, in particular a contaminated air flow where the fluid flow is directed to at least one inlet channel which narrows in the original fluid flow direction and which issues into an outlet channel for particles and where the purified fluid is directed through at least one fluid channel away from the inlet channel to a discharge channel.

SUMMARY OF THE INVENTION

The present invention is provided to address these and other considerations.

An object of the present invention is to provide a particle separator of the generic type mentioned in the introduction with which for a small technical expenditure a fluid flow, in particular an air flow, contaminated with particles can be efficiently purified, wherein a high rate of separation is to be achieved with a small loss of pressure. Furthermore a method is to be provided with which a particle separator is operated.

This object may be achieved in accordance with the invention by virtue of the fact that at least one of the fluid guide surfaces is curved at least in a region upstream of the outlet channel towards the inside of the inlet channel (outer fluid guide surface).

In accordance with the invention it is also provided that the particles in the converging region of the inlet channel are conveyed into the outlet channel and in so doing are forced onto a curved track where they are urged by centrifugal force onto the outer fluid guide surface and decelerated. In this manner the high rate of separation of the cyclone which is achieved by exploiting the centrifugal force can be combined with the simple structure of the gravity-fly separator.

In order to avoid turbulence at the fluid guide surfaces in the case of an advantageous embodiment the angle of impingement of the fluid flow contaminated with particles on the curved region of the outer fluid guide surface is smaller than 20°, preferably 15°.

In order to achieve a low-turbulent flow on the inside of the inlet channel the other fluid guide surface (inner fluid guide surface) is advantageously curved away from the inside of the inlet channel, so that a continuous narrowing of the inlet channel is achieved.

It is particularly advantageous when the two fluid guide surfaces are produced as peripheral segments of two hollow circular cylinders which have different axes. Circular cylinder peripheries can be produced without great technical expenditure since both the curvature radii and also the lengths of the curved region can be easily predetermined. The displacement of the axes ensures in a technically simple manner that the fluid guide surfaces converge.

In a further advantageous embodiment the hollow circular cylinders have equal radii so that it is possible to produce the two fluid guide surfaces using the same tool.

In a further particular advantageous embodiment, part of the curvature of the inlet channel increases towards the outlet channel. As a consequence it is achieved in an advantageous manner that with a reducing fluid rate and thus a reducing respective centrifugal force which acts on the individual particles the curvature radius becomes smaller towards the outlet channel.

It is particularly advantageous if the at least one fluid channel leads through the fluid guide surface of the inlet channel which is disposed opposite the outer fluid guide surface. As a consequence the openings in the outer fluid guide surface where turbulence can be caused are omitted.

In a further advantageous embodiment the at least one fluid channel comprises substantially an S-shape so that the purified fluid is directed along the fluid guide surface with a small amount of turbulence into the outer region.

In an expedient manner the at least one fluid channel leads substantially in the opposite direction to that of the original fluid flow away from the inlet channel, whereby particles are prevented from escaping through the fluid channel.

In an advantageous manner the outlet channel comprises a containment unit for particles which prevents the particles from passing back into the fluid flow.

In a particularly advantageous embodiment several inlet channels are disposed in a substantially parallel manner for cleaning large quantities of air.

In the case of the method in accordance with the invention the contaminated fluid is directed along a curved region of an outer fluid guide surface which defines the inlet channel, so that the centrifugal force conveys the particles to the outer fluid guide surface where they are decelerated.

In this case, it is particularly advantageous to guide the contaminated fluid flow onto the curved region of the outer fluid guide surface at an impingement angle which is less than 20°, preferably 15°, since in this manner it is possible to avoid the turbulence which occurs by reflexion of the contaminated fluid at the fluid guide surface of the inlet channel.

In a particularly advantageous embodiment of the method the purified fluid is directed through the at least one fluid channel substantially in the opposite direction to that of the original fluid flow direction, so that the particles cannot escape with the purified fluid out of the inlet channel.

BRIEF DESCRIPTION OF THE DRAWINGS

An exemplified embodiment of the invention is explained in detail hereinunder with reference to the drawing, in which:

FIG. 1 is a schematic illustration of a particle separator having two parallel connected inlet channels;

FIG. 2 is a detailed view of a fluid channel illustrated in FIG. 1 for the purified fluid; and, FIG. 3 is a schematic, isometric view of the particle separator illustrated in FIG. 1.

DETAILED DESCRIPTION OF THE PRESENT INVENTION

Figure 3:
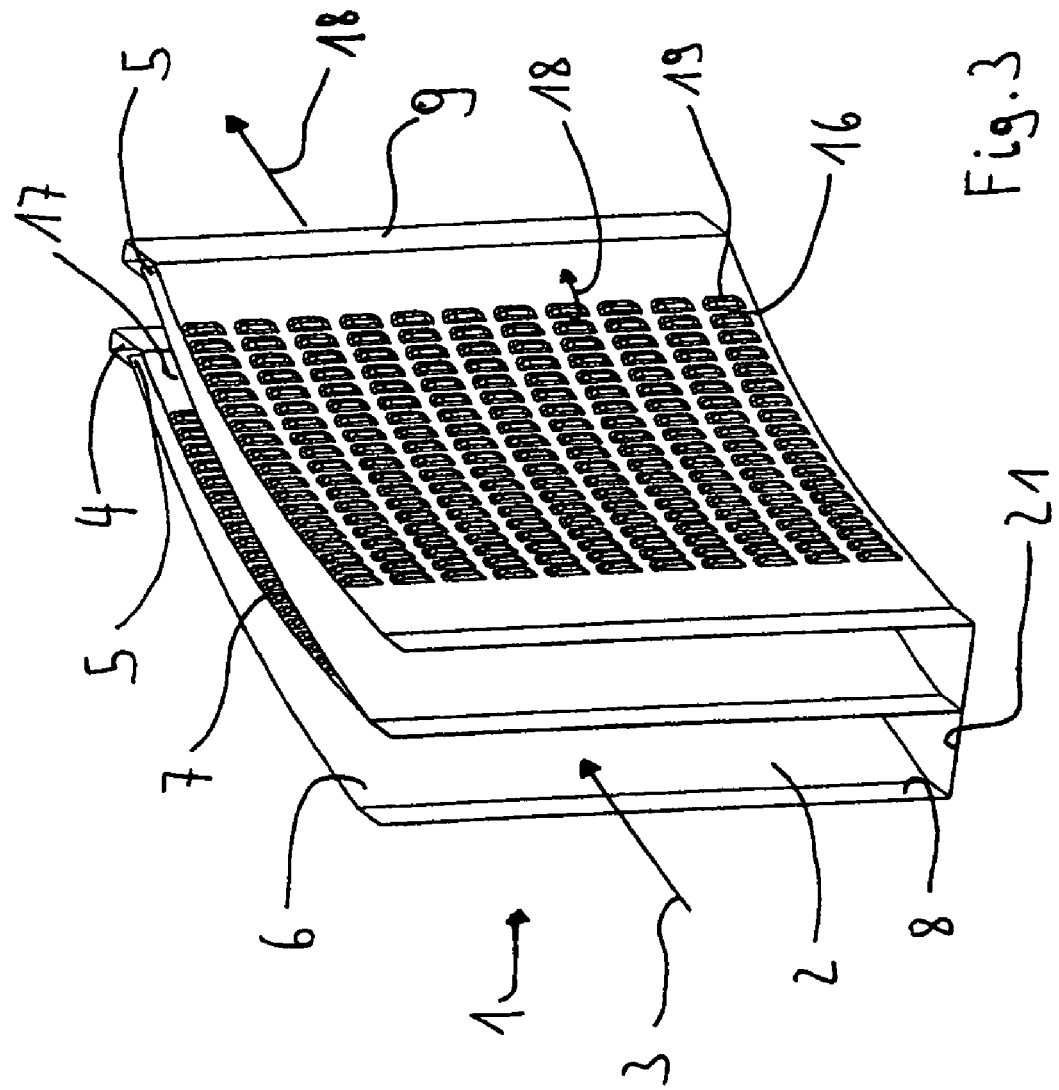

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The particle separator illustrated in FIG. 1 and designated overall by the reference numeral 1 for an air inlet unit, not illustrated, comprises two substantially identical inlet channels 2 running in parallel with each other for an air flow 3 which is contaminated with particles.

The inlet channels 2 narrow in the direction of the inflowing contaminated air flow 3. They issue in each case into an outlet channel 4 for the particles.

Furthermore, in each outlet channel 4 in a region in which the respective inlet channel 2 issues, a respective containment unit 5 for particles is produced by virtue of planar plates which prevent the particles from flowing back into the respective inlet channel 2.

The inlet channels 2 are defined in each case by air guide surfaces, namely an outer air guide plate 6 and an inner air guide plate 7 respectively. The outer air guide plates 6 are curved in each case towards the inside of the inlet channels 2, i.e. convexly as seen from the outside, the inner air guide plates 7 are curved in each case away from the inside of the inlet channels 2, i.e. concavely as seen from the outside.

At the respective entrance into the inlet channels 2 illustrated at the bottom in FIG. 1 there are provided in each case on both sides planar inlet guide plates 8 which lead into the air guide plates 6, 7. At the upper ends of the inlet channels 2 in FIG. 1 the curved air guide plates 6 and 7 lead into the outlet channels 4. The outlet channels 4 are defined on both sides by likewise planar outlet guide plates 9 which are aligned in the direction of the planar inlet guide plates 8. The particles are conveyed in this manner substantially in the original direction of the incoming, contaminated air flow 3 to the outlet channels 4.

The air guide plates 6 and 7 are formed in each case by segments of peripheral surfaces of two identical imaginary circular cylinders which are not illustrated and whose axes 10 and 11 extend in parallel with each other perpendicular to the plane of illustration in FIG. 1. By virtue of the fact that the axis 11 in FIG. 1 is displaced relative to the axis 10, the two air guide plates 6 and 7 are caused to extend towards each other and as a result the inlet channels 2 become narrower.

The length of the respective curve of the circular cylinder segments, which form the air guide plates 6 and 7, and the radius of the circular cylinders are predetermined dependent upon the mass and/or the dimension of the particles and the flow rate of the contaminated air flow 3. The curve lengths of the respective circular cylinder segment are defined by two likewise imaginary radii 12 and 13 illustrated in FIG. 1, wherein the respective central angle 14 between the radii 12 and 13 has for example a value between 10° and 90°. Values for example between 500 mm and 3000 mm are predetermined for the circular cylinder radius depending upon the particles.

The particle separator 1 is disposed in such a manner that the contaminated air flow 3 impinges from below on the outer air guide plates 6 of the inlet channels 2 at a maximum impingement angle 15 of 15° in FIG. 1, so that the contaminated air flow 3 adapts to the course of the air guide plates 6 and turbulence is avoided.

The inner air guide plates 7 comprise in each case a plurality of air channels 16 which lead in each case out of the inlet channels 2 into a discharge channel 17 for the purified air 18. The air channels 16 are formed by cuttings 19 in the inner air guide plates 7 which are curved away from the inlet channels 2 towards the respective discharge channel 17. The cuttings 19 comprise a cross-sectional shape in the form of an 'S' as also illustrated in the detailed view in FIG. 2. The air channels 16 extend substantially in the opposite direction to that of the original direction of the contaminated air flow 3. The S-shape of the air channels 16 renders possible a smooth transition from the respective inner air guide plates 7 to the respective discharge channel 17, so that turbulence is avoided in the purified air flow 18 flowing out of the inlet channels 2.

A first discharge channel 17 on the left-hand side in FIG. 1 is defined by the first inner air guide plate 7 on the left-hand side in FIG. 1 and by the second outer air guide plate 6 on the right-hand side in FIG. 1. A second discharge channel 17 on the right-hand side in FIG. 1 is defined by the second inner air guide plate 7 on the right-hand side in FIG. 1 and a closure plate 20 which extends in parallel with the outer air guide plates 6. The discharge channels 17 are defined in FIG. 1 at the top on their respective outlet region by the outlet guide plates 9 so that the purified air flow 18 flows out at this site in the same direction as the originally contaminated air flow 3 flows into the inlet channels 2. The particle separator 1 can therefore be disposed directly in a linear flow channel, not illustrated, of the air inlet unit without it being necessary to deflect the air flow.

FIG. 3 is an isometric illustration of the particle separator illustrated schematically in FIG. 1. However, for ease of understanding, the closure plate 20, the imaginary axes 10 and 11 and the imaginary radii 12 and 13 are omitted from the illustration. FIG. 3 illustrates instead at the bottom base plates 21 which are disposed perpendicular to the air guide plates 6 and 7 and define the inlet channels 2 at the end face.

If the particle separator 1 is now operated, then the air flow 3 which is contaminated with particles flows at a predetermined flow rate at an angle of less than 15° with respect to the outer air guide plates 6 in FIG. 1 from below into the inlet channels 2.

The contaminated air flow 3 flows along the outer air guide plates 6, wherein owing to the centrifugal force the particles are conveyed to the left in FIG. 1 to the outer air guide plates 6. Friction at the outer air guide plates 6 causes the flow rate to reduce so that the particles at the end of the inlet channels 2 pass in the outlet channels 4 into a calm zone. The decelerated particles fall owing to the gravitational force along the air guide plates 6 or in the outlet channels 4 to the bottom in FIG. 1 and are exhausted in a manner known per se.

The purified air flow 18 flows substantially in the opposite direction to that of the original contaminated air flow 3 through the air channels 16 out of the inlet channels 2 into the outlet channels 17 through which it leaves the particle separator 1.

In place of the peripheral surface of a circular cylinder it is also possible to provide a spiral-shaped curvature of the air guide plates which tapers to the outlet channel 4, so that the reduction in the flow rate and an associated reduction in the centrifugal force can be compensated by a reducing curvature radius.

All air guide surfaces can also consist of material other than metal, for example carbon fibre.

It is to be understood that the aspects and objects of the present invention described above may be combinable and that other advantages and aspects of the present invention will become apparent upon reading the following description of the drawings and detailed description of the invention.

The invention claimed is:

1. A particle separator, comprising at least one inlet channel for a fluid flow contaminated with particles, which is defined by two opposing fluid guide plates, narrows in the fluid flow direction and issues into an outlet channel for particles and which is connected to at least one fluid channel for the purified fluid which leads away from the inlet channel into a region outside the inlet channel,
wherein,
at least one of the opposing fluid guide plates the outer fluid guide plate is curved at least in one region upstream of the outlet channel towards the inside of the inlet channel,
at least one discharge channel is defined at one side by the inner fluid guide plate of a first inlet channel and, at the opposite side, by the outer fluid guide plate of a second inlet channel
further comprising a plurality of inlet channels disposed in a substantially parallel manner.

2. The particle separator of claim 1, wherein the other of the two opposing fluid guide plates the inner fluid guide plate is curved away from the inside of the inlet channel.

3. The particle separator of claim 1, wherein a part of the curvature of the inlet channel increases in the direction towards the outlet channel.

4. The particle separator of claim 1, wherein at least one fluid channel leads through the fluid guide plate which is disposed opposite the outer fluid guide plate.

5. The particle separator of claim 1, wherein at least one fluid channel is substantially in the shape of an 'S'.

6. The particle separator of claim 1, wherein at least one fluid channel leads away from the inlet channel substantially in the opposite direction to the original fluid flow direction.

7. The particle separator of claim 1, wherein outlet channel comprises a containment unit for particles.

8. The particle separator of claim 1, wherein the two fluid guide plates are formed as periphery segments of two hollow circular cylinders which have different axes.

9. The particle separator of claim 8, wherein the circular cylinders have identical radii.

10. The particle separator of claim 1, wherein an impingement angle of the fluid flow contaminated with particles is smaller than 20° on the curved region of the outer fluid guide plate.

11. The particle separator claim 10, wherein a part of the curvature of the inlet channel increases in the direction towards the outlet channel.

12. The particle separator of claim 10, wherein at least one fluid channel leads through the fluid guide plate which is disposed opposite the outer fluid guide plate.

13. The particle separator of claim 10, wherein the other of the two fluid guide plates the inner fluid guide plate is curved away from the inside of the inlet channel.

14. The particle separator of claim 13, wherein the two fluid guide plates are formed as periphery segments of two hollow circular cylinders which have different axes.

15. The particle separator of claim 13, wherein the circular cylinders have identical radii.

* * * * *